US010677183B2

(12) United States Patent
Akagi et al.

(10) Patent No.: US 10,677,183 B2
(45) Date of Patent: Jun. 9, 2020

(54) INTERNAL COMBUSTION ENGINE CONTROL APPARATUS

(71) Applicant: HITACHI AUTOMOTIVE SYSTEMS, LTD., Hitachinaka-shi, Ibaraki (JP)

(72) Inventors: Yoshihiko Akagi, Hitachinaka (JP); Seiji Asano, Hitachinaka (JP); Kazuhiro Oryoji, Chiyoda-ku (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 14 days.

(21) Appl. No.: 16/066,807

(22) PCT Filed: Nov. 16, 2016

(86) PCT No.: PCT/JP2016/083877
§ 371 (c)(1),
(2) Date: Jun. 28, 2018

(87) PCT Pub. No.: WO2017/130527
PCT Pub. Date: Aug. 3, 2017

(65) Prior Publication Data
US 2019/0024600 A1 Jan. 24, 2019

(30) Foreign Application Priority Data
Jan. 27, 2016 (JP) ................. 2016-013725

(51) Int. Cl.
F02D 41/18 (2006.01)
F02D 41/00 (2006.01)
F02M 26/48 (2016.01)
F02D 37/02 (2006.01)
F02M 35/10 (2006.01)
F02D 41/14 (2006.01)
(Continued)

(52) U.S. Cl.
CPC ........... F02D 41/182 (2013.01); F02D 37/02 (2013.01); F02D 41/0072 (2013.01);
(Continued)

(58) Field of Classification Search
CPC .... F02D 41/182; F02D 41/38; F02D 41/0072; F02D 2200/0418; F02D 2041/389
See application file for complete search history.

(56) References Cited

U.S. PATENT DOCUMENTS 4,971,009 A 11/1990 Washino et al.
6,571,616 B1 6/2003 Tsukamoto et al.
(Continued)

FOREIGN PATENT DOCUMENTS

JP S62-203942 A 9/1987
JP H02-256850 A 10/1990
(Continued)

OTHER PUBLICATIONS

Office Action issued in corresponding Japanese Application No. 2017-563708 dated Jul. 16, 2019, with English Translation.
(Continued)

Primary Examiner — George C Jin
(74) Attorney, Agent, or Firm — Foley & Lardner LLP

(57) ABSTRACT

Fuel injection control of an internal combustion engine requires an optimized fuel amount that can be burned completely with oxygen in intake air to be supplied, but the oxygen concentration in the atmospheric air is affected by humidity.
By separately calculating a dry air flow rate that directly affects the oxygen amount and a humidity flow rate that is a change factor of the oxygen concentration in the intake air of the internal combustion engine, the fuel can be supplied to the cylinder of the internal combustion engine at an optimized air-fuel ratio. In addition, highly precise control involving EGR for flowback of a part of the exhaust gas flowing in the exhaust pipe to the intake pipe can also be achieved.

13 Claims, 10 Drawing Sheets

(51) Int. Cl.
*F02P 5/152* (2006.01)
*F02M 26/46* (2016.01)
*F02M 26/47* (2016.01)
*F02D 41/38* (2006.01)
*F02D 41/04* (2006.01)

(52) U.S. Cl.
CPC ......... *F02D 41/1486* (2013.01); *F02D 41/38* (2013.01); *F02M 26/46* (2016.02); *F02M 26/47* (2016.02); *F02M 26/48* (2016.02); *F02M 35/10373* (2013.01); *F02M 35/10393* (2013.01); *F02P 5/1521* (2013.01); *F02D 41/045* (2013.01); *F02D 2041/389* (2013.01); *F02D 2200/0402* (2013.01); *F02D 2200/0406* (2013.01); *F02D 2200/0414* (2013.01); *F02D 2200/0418* (2013.01); *F02D 2200/703* (2013.01); *Y02T 10/47* (2013.01)

(56) References Cited

U.S. PATENT DOCUMENTS

2017/0284323 A1* 10/2017 Hagari ................... F02M 26/47
2018/0313286 A1* 11/2018 Haga .................. F02D 41/0085

FOREIGN PATENT DOCUMENTS

| JP | H08-135519 A | 5/1996 |
| JP | H09-304322 A | 11/1997 |
| JP | 2000-328999 A | 11/2000 |
| JP | 2003-222050 A | 8/2003 |
| JP | 2005-330922 A | 12/2005 |
| JP | 2008-286019 A | 11/2008 |
| JP | 2009-024685 A | 2/2009 |
| JP | 2011-001853 | 1/2011 |
| JP | 2012-246792 A | 12/2012 |
| JP | 2013-181460 A | 9/2013 |
| JP | 2015-078637 A | 4/2015 |

OTHER PUBLICATIONS

International Search Report with English translation and Written Opinion issued in corresponding application No. PCT/JP2016083877 dated Feb. 14, 2017.

Office Action issued in Japanese patent application No. 2017-563708, dated Mar. 26, 2019.

* cited by examiner

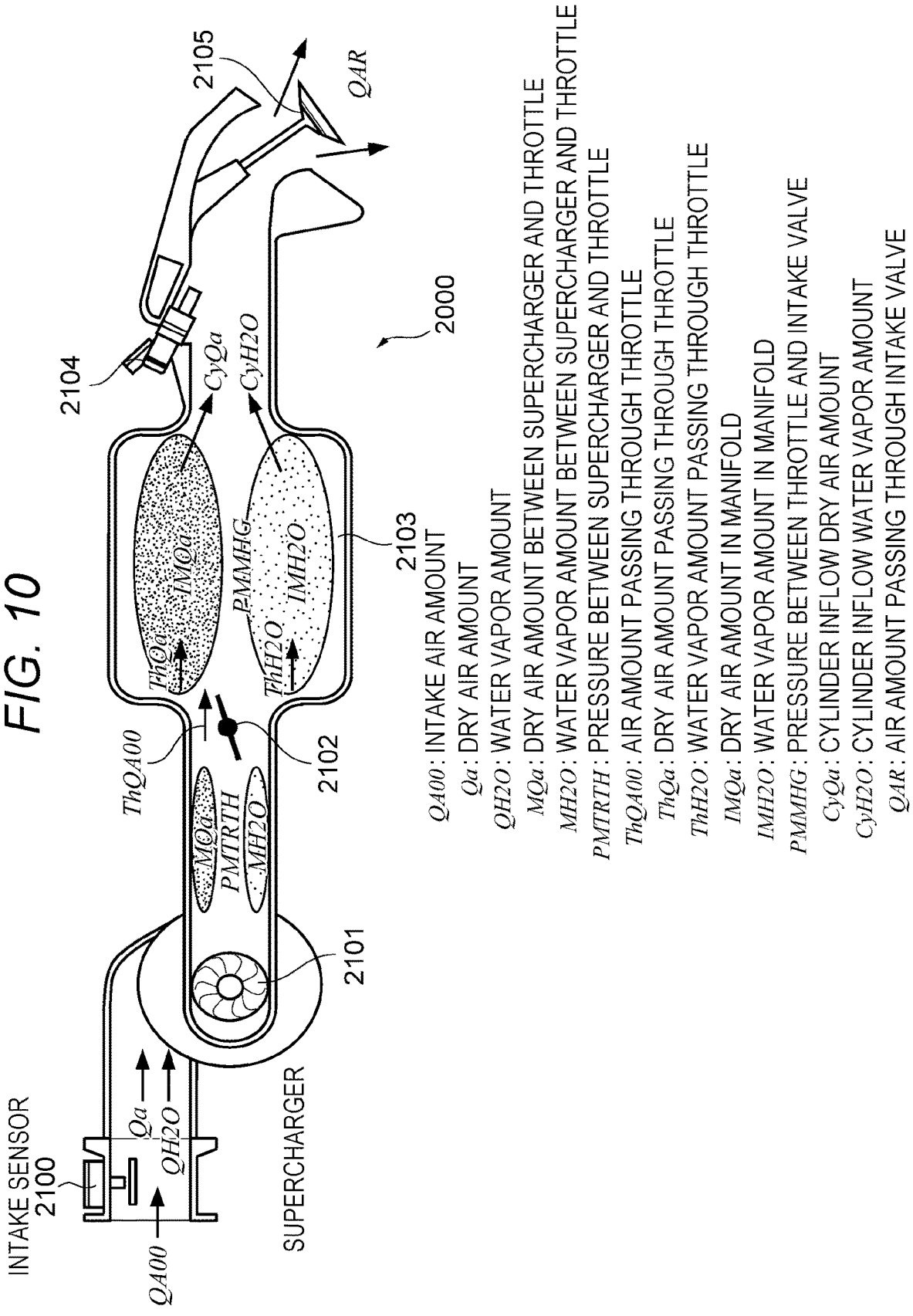

INTERNAL COMBUSTION ENGINE CONTROL APPARATUS

TECHNICAL FIELD

The present invention relates to an internal combustion engine control apparatus, such as an internal combustion engine control apparatus capable of highly precisely controlling fuel injection and associated EGR control of an engine.

BACKGROUND ART

A technique for measuring humidity of intake air and correcting a fuel injection amount using the measured humidity has been known (e.g., see PTL 1).

CITATION LIST

Patent Literature

PTL 1: JP H09-304322 A

SUMMARY OF INVENTION

Technical Problem

The past technique disclosed above has mainly aimed to correct errors caused by the humidity from the sensor.

Meanwhile, in controlling fuel injection of the engine, it is necessary to provide a proper amount of fuel capable of being completely burned with oxygen in the intake air, but in natural environment, an oxygen concentration in the intake air changes with humidity.

Therefore, the past technique disclosed above that has not considered the change of oxygen concentration corresponding to the humidity in the intake air cannot supply fuel with an optimized air-fuel ratio and, therefore, cannot control the fuel injection amount correctly and highly precisely.

The present invention has been made to solve the above problem, and it is an object of the present invention to provide an internal combustion engine control apparatus capable of supplying fuel into a cylinder of an internal combustion engine with an optimized air-fuel ratio and, therefore, controlling a fuel injection amount properly and precisely.

Solution to Problem

To solve the above problem, an internal combustion engine control apparatus according to an embodiment of the present invention is configured to control a fuel injection amount of fuel injected into a cylinder through a fuel injection valve in accordance with a detected humidity detected by a humidity sensor that is disposed in an intake pipe to detect humidity of a portion of the intake pipe upstream of an intake air throttle valve, in which the internal combustion engine control apparatus calculates or corrects the fuel injection amount of the fuel injection valve with a dry air flow rate calculated or estimated in accordance with the detected humidity detected by the humidity sensor.

Advantageous Effects of Invention

According to the embodiment of the present invention, it is possible to supply fuel with an optimized air-fuel ratio into the cylinder of the internal combustion engine from a detected humidity detected by a humidity sensor that detects humidity of a portion upstream of the intake air throttle valve by separately calculating the dry air flow rate that directly affects an oxygen amount in the intake air and the humidity flow rate that is a change factor of the oxygen concentration of the intake air in the internal combustion engine. In addition, it is possible to achieve highly precise control involving EGR for flowback of a part of the exhaust gas in the exhaust pipe to the intake pipe.

Other problems, structures, and effects that are not described above will be apparent from the following description of the embodiment.

BRIEF DESCRIPTION OF DRAWINGS

FIG. 10 is a schematic view illustrating a part of an example of the internal combustion engine (engine) (with a supercharger) to which the internal combustion engine control apparatus according to the embodiment of the present invention is applied.

DESCRIPTION OF EMBODIMENTS

An embodiment of the present invention will be described below by referring to the accompanying drawings.

Figure 1:
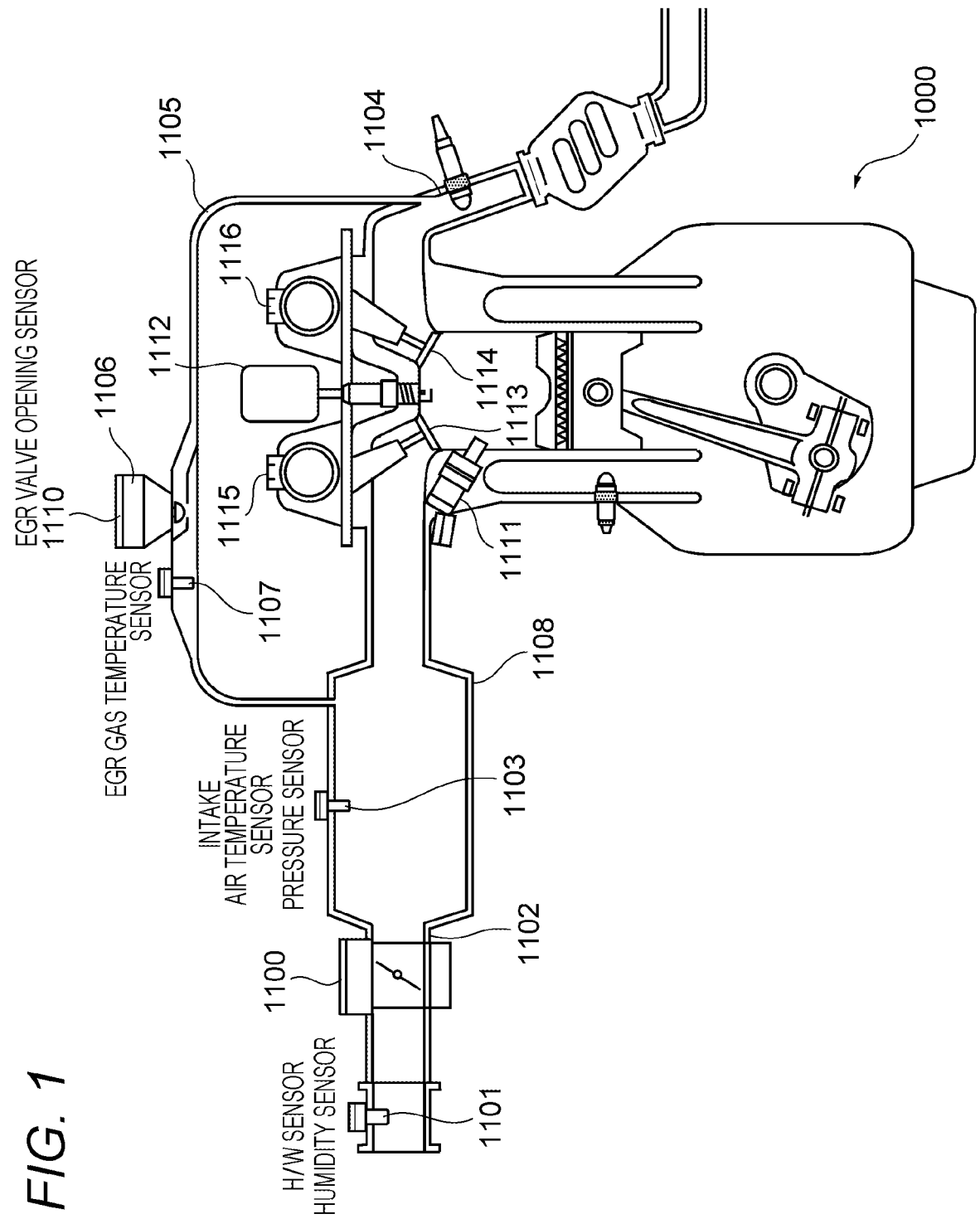
FIG. 1 is a schematic view illustrating an example structure of an entire internal combustion engine (engine) (with an exhaust gas flowback apparatus) to which an internal combustion engine control apparatus according to an embodiment of the present invention is applied.

FIG. 1 illustrates an example of the entire structure of an internal combustion engine (engine) (with an exhaust gas flowback apparatus) of an internal combustion engine control apparatus representing a subject matter of the present invention.

An engine 1000 of an illustrated embodiment includes, for example, a humidity sensor 1101 disposed upstream of an intake air throttle valve (which is also referred to as a throttle) 1100 and formed unitarily with a mass flow sensor (e.g., an H/W sensor) to measure an intake air amount, a pressure sensor 1103 formed unitarily with an intake air temperature sensor that measures a temperature of air in the intake pipe 1102 to measure a pressure in the intake pipe 1102, an EGR valve opening sensor 1110 set in the middle of a channel (EGR channel) 1105 connecting an exhaust pipe 1104 and the intake pipe 1102 of the engine 1000 to detect an opening of an EGR valve 1106 that regulates flow rate of an exhaust gas (also referred to as an EGR gas) flowing through the channel 1105, and an EGR gas temperature sensor 1107 that measures a temperature of the exhaust gas in the channel 1105. A connecting position of the channel 1105 and the intake pipe 1102 (that is, a flowback vent of the exhaust gas) is located downstream of the humidity sensor 1101 (especially at a collector 1108 downstream of the intake air throttle valve 1100). This prevents the exhaust gas flowing back to the intake pipe 1102 through the channel 1105 from the exhaust pipe 1104 from reaching the humidity sensor 1101.

The engine 1000 also includes a fuel injection valve 1111 provided for each cylinder (of four cylinders, for example) to supply (inject) fuel into the cylinder, and an ignition coil 1112 that ignites the fuel supplied into the cylinder. The engine 1000 also includes an intake valve phase changing unit 1115 and an exhaust valve phase changing unit 1116, respectively, that change the phase of the intake valve 1113 and the exhaust valve 1114 disposed at each cylinder.

Figure 2:
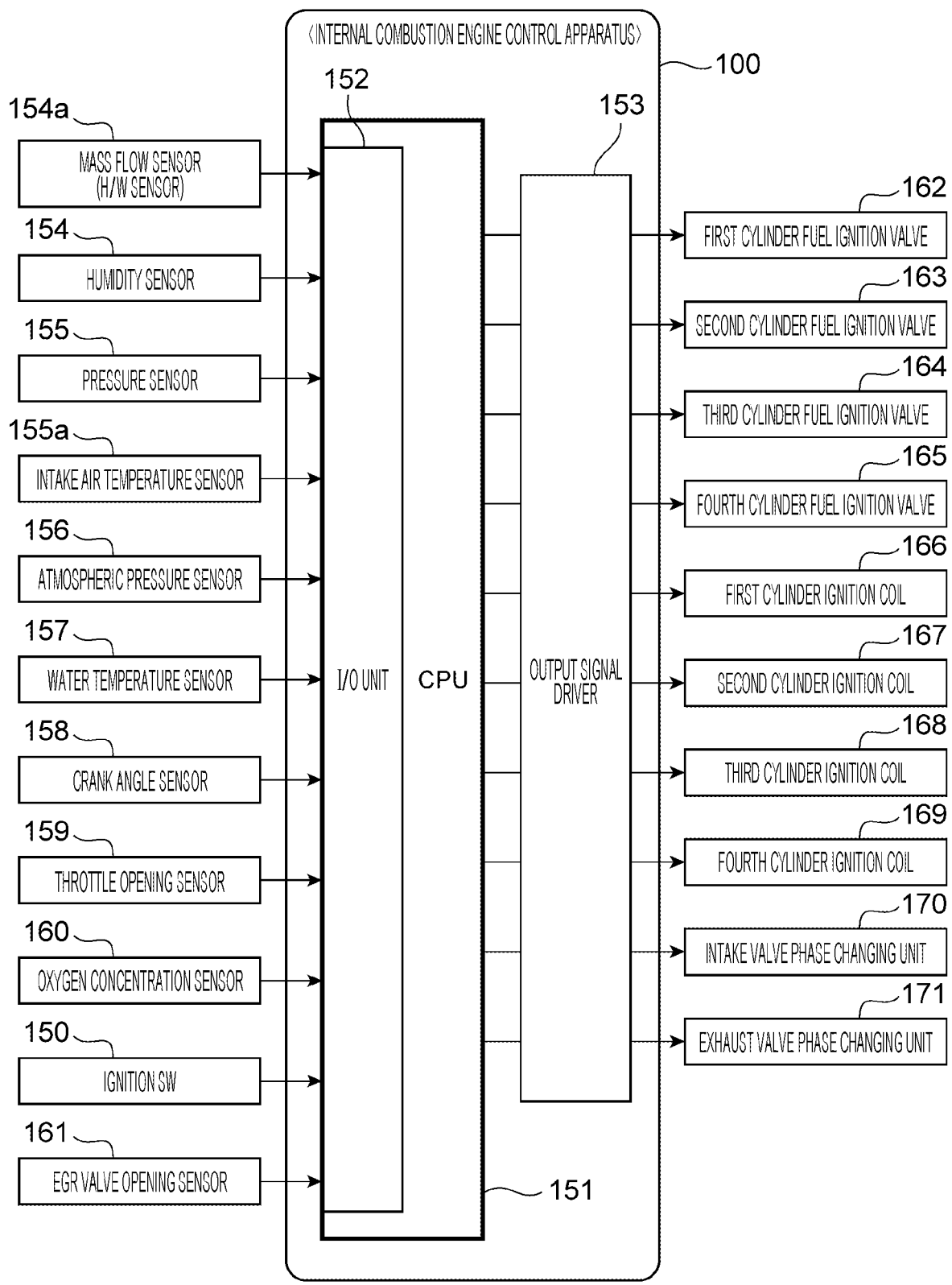
FIG. 2 illustrates an example of an internal configuration of the internal combustion engine control apparatus according to the embodiment of the present invention.

FIG. 2 illustrates an example of an internal configuration of the internal combustion engine control apparatus representing the subject matter of the present invention.

The internal combustion engine control apparatus 100 is basically formed of a CPU 151 and an output signal driver 153. The CPU 151 includes an I/O unit 152 that converts an electric signal from each sensor of the engine to a signal for digital calculation processing. To the CPU 151, an output signal driver 153 that converts a control signal for digital calculation processing into a practical actuator drive signal for output is connected.

Specifically, the I/O unit 152 receives electric signals obtained from sensors including a mass flow sensor (e.g., an H/W sensor) 154a, a humidity sensor 154, a pressure sensor 155, an intake air temperature sensor 155a, an atmospheric pressure sensor 156, a water temperature sensor 157, a crank angle sensor 158, a throttle valve (throttle) opening sensor 159, an oxygen concentration sensor 160, an ignition SW 150, and an EGR valve opening sensor 161. The CPU 151 calculates an actuation amount of each actuator in accordance with the signal input to the I/O unit 152 and, from the calculation result, transmits the drive signal via the output signal driver 153 to fuel injection valves (herein the fuel injection valves for four cylinders) 162 to 165, ignition coils 166 to 169, an intake valve phase changing unit 170, an exhaust valve phase changing unit 171, and the like.

Figure 3:
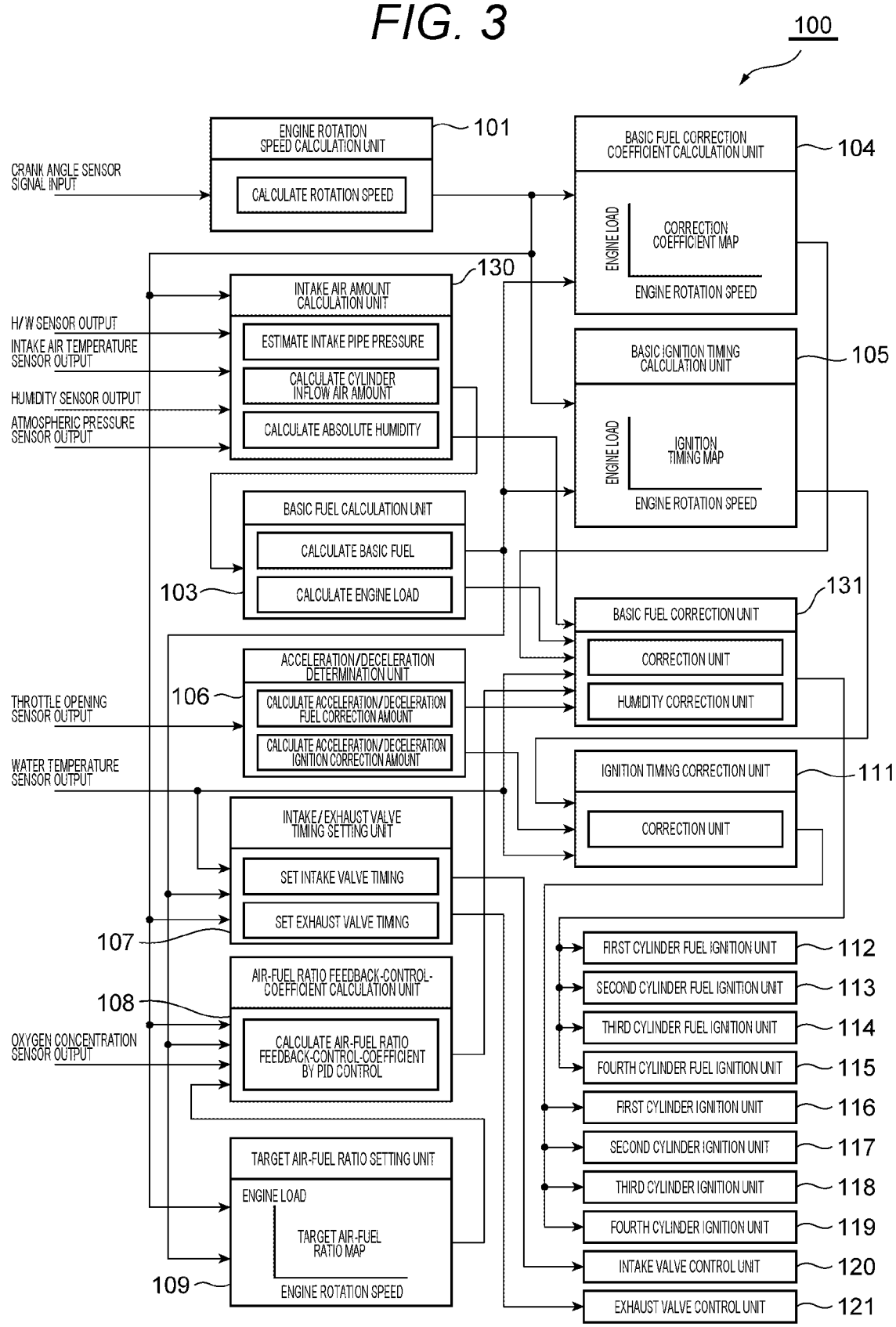
FIG. 3 is a block diagram illustrating an example of control blocks of the internal combustion engine control apparatus according to the embodiment of the present invention.

FIG. 3 illustrates an example of control blocks carrying out calculations in the CPU 151 of the internal combustion engine control apparatus which represents the subject matter of the present invention. This example is configured to calculate an absolute humidity according to a detected humidity or the like detected by the humidity sensor and, in accordance with the calculated absolute humidity or the like, corrects a basic fuel injection amount of the fuel to be injected into the cylinder through the fuel injection valve.

Block 101 represents a block of an engine rotation speed calculation unit. The block 101 calculates a rotation speed of the engine per unit time by counting the number of times of input of the electric signal, or mainly a pulse signal change, per unit time from the crank angle sensor that is set at a predetermined crank angle position of the engine. Block 130 is a block that calculates a pressure estimate value of the intake pipe from the output of the mass flow sensor (e.g., the H/W sensor), the intake air temperature sensor, the humidity sensor, and the atmospheric pressure sensor, as well as the engine rotation speed calculated in the block 101. The block 130 then estimates or calculates an air amount flowing into the cylinder (a cylinder inflow air amount) of the engine and calculates the absolute humidity. Block 103 is a block that calculates a basic fuel required by the engine in each region and an engine load index representing an engine load according to the engine rotation speed calculated in the block 101 and the amount of air flowing into the cylinder of the engine. Block 104 is a block that calculates a correction coefficient of the basic fuel amount calculated in the block 103 in each operation region of the engine according to the engine rotation speed calculated in the block 101 and the engine load calculated in the block 103. Block 105 is a block that determines optimized ignition timing in each operation region of the engine by, for example, map search according to the engine rotation speed and the engine load.

Block 106 is a block that determines whether the engine is in a transient state according to the throttle valve opening obtained from the throttle valve opening sensor and calculates an acceleration/deceleration fuel correction amount and an acceleration/deceleration ignition correction amount in association with the transient state. Block 107 is a block that determines optimized open/close timing of the intake and exhaust valves of the engine according to the engine rotation speed, the engine load, and the engine water temperature. Block 108 is a block that calculates an air-fuel ratio feedback control coefficient to maintain the air-fuel ratio of a mixed air of fuel and air supplied to the engine to a target air-fuel ratio, which is described later, according to, for example, the output of the oxygen concentration sensor disposed in the exhaust pipe of the engine. Although the oxygen concentration sensor mentioned above outputs a signal proportional to the air-fuel ratio of the exhaust gas, two signals representing rich and lean sides of the exhaust gas relative to a theoretical air-fuel ratio may also be output.

Block 109 is a block that determines an optimized target air-fuel ratio in each operation region of the engine by map search or the like according to the engine rotation speed and the engine load. The target air-fuel ratio determined in the block 109 is used in the air-fuel ratio feedback control in the block 108.

Block 131 is a block that corrects the basic fuel calculated in the block 103 with, for example, the basic fuel correction coefficient from the block 104, the acceleration/deceleration fuel correction amount from the block 106, and the air-fuel ratio feedback control coefficient from the block 108. In addition, block 111 is a block that corrects the ignition timing determined by map search or the like in the block 105 with the acceleration/deceleration fuel correction amount from the block 106.

Meanwhile, block 131 corrects the basic fuel (amount), which is calculated in the block 103, with the decrease of the oxygen concentration caused by the absolute humidity calculated in the block 130, and outputs the correction result to blocks 112 to 115 which are fuel injection units for the cylinders, to therefore inject fuel corresponding to the humidity and various engine state quantities. For example, if it is determined that the absolute humidity calculated in the block 130 is relatively high and the oxygen concentration decreases (in other words, oxygen is diluted), an error occurs on the rich side where the fuel injection amount becomes excessive. Therefore, the fuel amount is corrected to decrease relative to the basic fuel (amount) calculated in the block 103, and the correction result is output to the blocks 112 to 115 which are the fuel injection units. In contrast, if it is determined that the absolute humidity calculated in the block 130 is relatively low and the oxygen concentration increases (in other words, oxygen is concentrated), an error occurs on the lean side where the fuel injection amount is insufficient. Therefore, the fuel amount is corrected to increase relative to the basic fuel (amount) calculated in the block 103, and the correction result is output to the blocks 112 to 115 which are the fuel injection units.

The blocks 116 to 119 are ignition units for igniting the fuel-air mixture that flows into the cylinder corresponding to the required ignition timing of the engine after the correction in the block 111. Blocks 120 and 121 are control units for controlling open/close timing of the intake and exhaust valves calculated in the block 107.

In this configuration example, the humidity sensor is provided upstream of the intake air throttle valve, so that the influence of humidity other than the intake air can be decreased. Meanwhile, the oxygen is diluted due to the water vapor contained in the intake air, and without considering the water vapor component, the error should occur on the rich side where the fuel injection amount becomes excessive. By determining the dry air amount (or dry air flow rate) including no humidity and injecting the fuel from the fuel injection valve in accordance with the determined dry air amount, the engine can be operated with a proper fuel injection amount.

Figure 4:
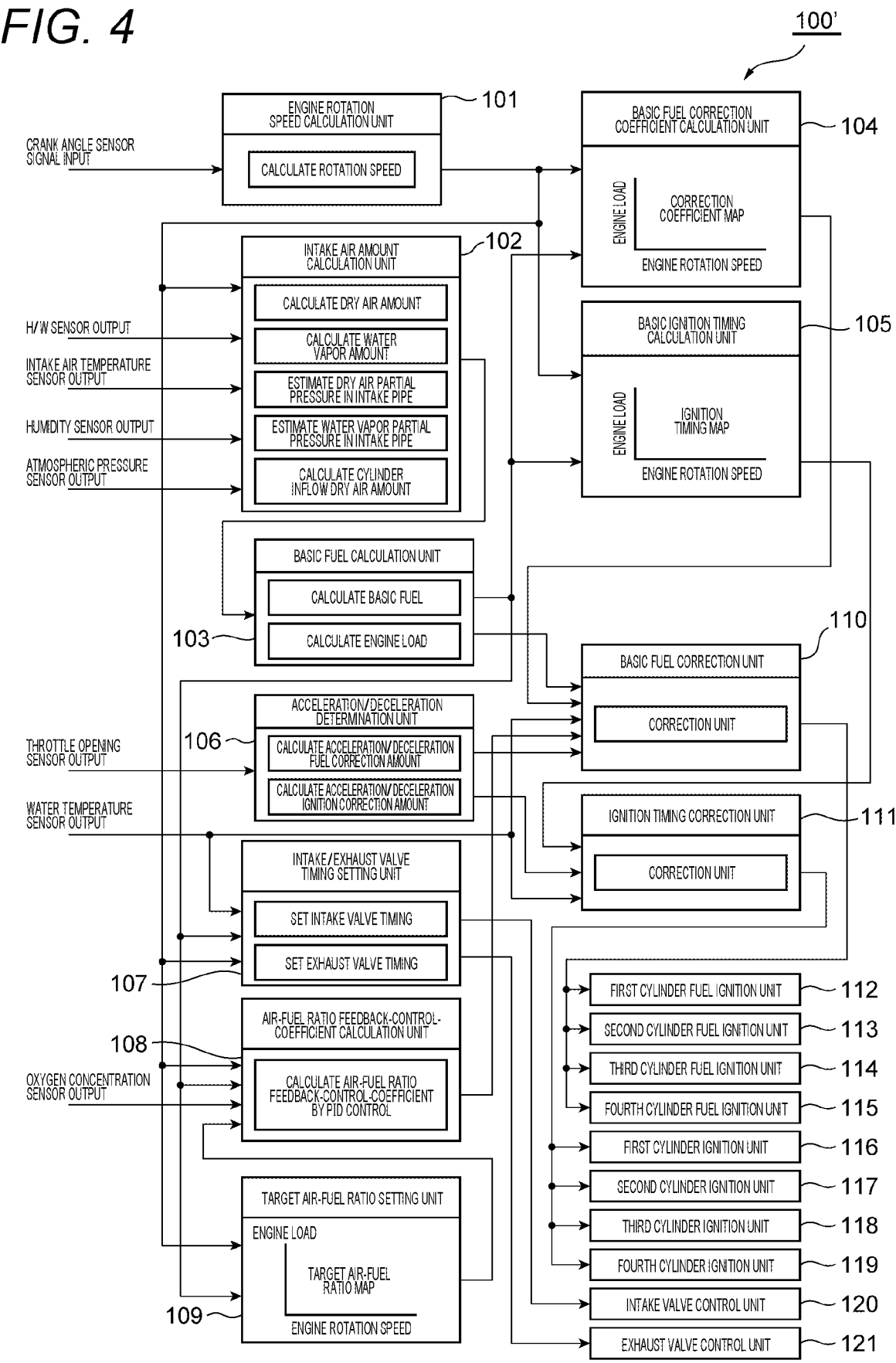
FIG. 4 is a block diagram illustrating another example of control blocks of the internal combustion engine control apparatus according to the embodiment of the present invention.

FIG. 4 illustrates another example of control blocks carrying out calculations in the CPU 151 of the internal combustion engine control apparatus representing the subject matter of the present invention. In this example, the cylinder inflow dry air amount is calculated from the detected humidity detected by the humidity sensor and, in accordance with the calculated cylinder inflow dry air amount, the basic fuel injection amount of the fuel to be injected into the cylinder from the fuel injection valve is calculated.

Block 101 represents a block of an engine rotation speed calculation unit. The block 101 calculates a rotation speed of the engine per unit time by counting the number of times of input of the electric signal, or mainly a pulse signal change, per unit time from the crank angle sensor that is set at a predetermined crank angle position of the engine. Block 102 is a block that calculates a dry air amount (or a dry air flow rate) and a water vapor amount (or a water vapor flow rate) in the intake air according to the output of the mass flow sensor (e.g., the H/W sensor), the intake air temperature sensor, the humidity sensor, and the atmospheric pressure sensor, as well as the engine rotation speed calculated in the block 101. The block 102 then uses the calculation result to estimate a dry air partial pressure and a water vapor partial pressure in the intake pipe, and uses the estimation result to estimate or calculate the air amount (cylinder inflow dry air amount) (and the water vapor amount) flowing into the cylinder of the engine according to the operation conditions of the engine. Block 103 is a block that calculates a basic fuel required by the engine in each region and an engine load index representing an engine load according to the engine rotation speed calculated in the block 101 and the amount of air flowing into the cylinder (cylinder inflow dry air amount) of the engine. Block 103 calculates the basic fuel (amount) in such a manner that, for example, the basic fuel (amount) required by the engine increases if the cylinder inflow dry air amount is relatively large, while the basic fuel (amount) required by the engine decreases if the cylinder inflow dry air amount is relatively small. The block 103 thus maintains the optimized air-fuel ratio. That is, the block 103 calculates the basic fuel (amount) so that the basic fuel (amount) required by the engine increases (or decreases) according to the increase (or decrease) of the cylinder inflow dry air amount. Since the present embodiment estimates the dry air amount in the intake pipe, block 110 that represents the basic fuel correction unit does not include the humidity correction unit illustrated in FIG. 3.

Other constituent components of the configuration are similar to those of FIG. 3.

In this configuration example, the dry air flow rate is estimated according to the humidity detected by the humidity sensor, while the dry air amount and the water vapor amount reaching the intake pipe and enter (flow into) the cylinder are determined and, in accordance with the determined reaching amount, the fuel is injected through the fuel injection valve. Thus, the engine can be operated with a proper fuel injection amount.

Figure 5:
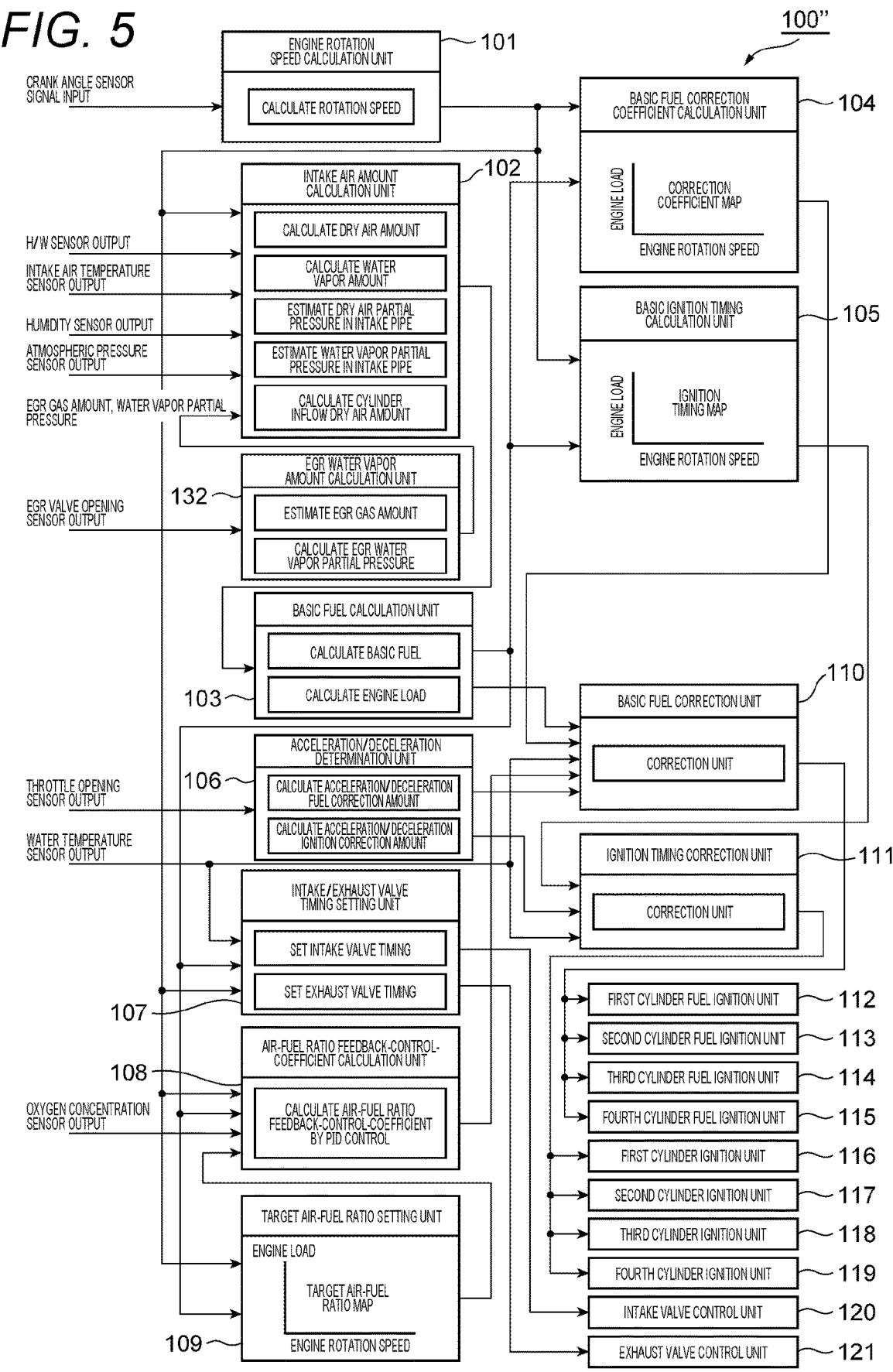
FIG. 5 is a block diagram illustrating a still another example of control blocks of the internal combustion engine control apparatus according to the embodiment of the present invention.

FIG. 5 illustrates a still another example of control blocks carrying out calculations in the CPU 151 of the internal combustion engine control apparatus (control blocks of the internal combustion engine control apparatus considering an EGR gas component) representing the subject matter of the present invention. In comparison with the internal combustion engine control apparatus illustrated in FIG. 4, the present example calculates the cylinder inflow dry air amount by considering the EGR gas component and, in accordance with the calculated cylinder inflow dry air amount, calculates the basic fuel injection amount of the fuel to be injected into the cylinder through the fuel injection valve.

Block 101 represents a block of an engine rotation speed calculation unit. The block 101 calculates a rotation speed of the engine per unit time by counting the number of times of input of the electric signal, or mainly a pulse signal change, per unit time from the crank angle sensor that is set at a predetermined crank angle position of the engine. Block 132 is a block that estimates an EGR gas amount (exhaust gas flowback amount) from the output of the EGR valve opening sensor by considering the operation condition of the engine and calculates an EGR water vapor partial pressure. Block 102 is a block that calculates a dry air amount (or a dry air flow rate) and a water vapor amount (or a water vapor flow rate) in the intake air according to the output of the mass flow sensor (e.g., the H/W sensor), the intake air temperature sensor, the humidity sensor, and the atmospheric pressure sensor, as well as the engine rotation speed calculated in the block 101. Further, the block 102 considers the EGR gas amount and the water vapor partial pressure calculated in the block 132 to estimate the dry air partial pressure and a water vapor partial pressure in the intake pipe. The block 102 then uses the estimation result to estimate or calculate the air amount (the cylinder inflow dry air amount) (and the water vapor amount) flowing into the cylinder of the engine according to the operation conditions of the engine. Block 103 is a block that calculates a basic fuel required by the engine in each region and an engine load index representing an engine load according to the engine rotation speed calculated in the block 101 and the amount of air flowing into the cylinder (cylinder inflow dry air amount) of the engine. For example, if the EGR gas amount, especially the EGR water vapor partial pressure, is relatively large, it is estimated that the cylinder inflow dry air amount relatively decreases. To maintain an optimized air-fuel ratio, therefore, the block 103 calculates the basic fuel (amount) so that the basic fuel (amount) required by the engine decreases. In contrast, if the EGR gas amount, especially the EGR water vapor partial pressure, is relatively small, it is estimated that the cylinder inflow dry air amount increases proportionally. To maintain the optimized air-fuel ratio, therefore, the block 103 calculates the basic fuel (amount) so that the basic fuel (amount) required by the engine increases. That is, the block 103 calculates the basic fuel (amount) so as to decrease (or increase) the basic fuel (amount) required by the engine corresponding to the increase (or decrease) of the EGR gas amount, especially the EGR water vapor partial pressure. Similar to the embodiment of FIG. 4, the present embodiment estimates the dry air amount in the intake pipe, so that block 110 of the basic fuel correction unit does not include the humidity correction unit illustrated in FIG. 3.

Other constituent components of the configuration are similar to those of FIGS. 3 and 4.

In such configuration examples, the water vapor amount supplied from the EGR gas (flowback gas) is added to the water vapor amount in the intake air, whereby the water vapor amount in the cylinder can be estimated. As a result, since there is a delay in transferring the change of the humidity to the inside of the cylinder, the optimized fuel injection amount cannot be obtained if the measurement result is used without modification. To estimate the change of the water vapor in the cylinder, therefore, correct estimation of the water vapor flow rate in the intake pipe is necessary.

Figure 6:
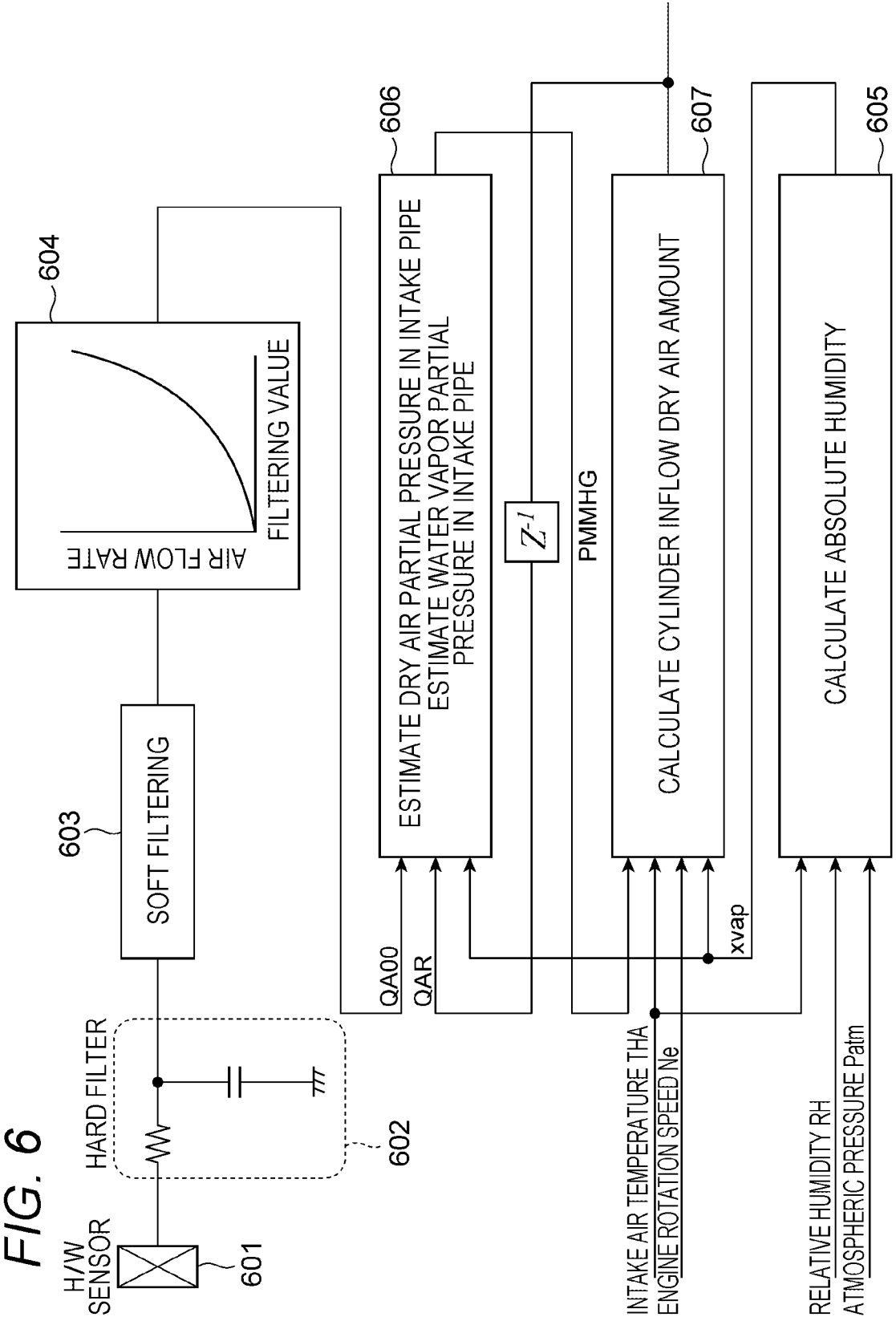
FIG. 6 is a block diagram illustrating a main part of the control blocks of the internal combustion engine control apparatus according to the embodiment of the present invention.

FIG. 6 illustrates a main part of the control blocks of the internal combustion engine control apparatus representing the subject matter of the present invention.

An output voltage corresponding to the flow rate obtained from a mass flow sensor (e.g., an H/W sensor) 601 disposed upstream of the intake air throttle valve is filtered with a hard filter 602 and is then subjected to soft filtering in block 603. In block 604, an output voltage value (filtered value) which is a filtered value of the intake air flow rate is converted to the air flow rate corresponding to the voltage by table search. Block 605 calculates an absolute humidity xvap using an intake air temperature THA which is an output value of the intake air temperature sensor entered to the block 605, a relative humidity RH which is an output value of the humidity sensor, and an atmospheric pressure Patm which is an output value of the atmospheric pressure sensor.

Block 606 is a block that estimates the dry air partial pressure and the water vapor partial pressure in the intake pipe from, for example, the absolute humidity xvap calculated in the block 605. Block 607 is a block that calculates the dry air amount flowing into the cylinder from the estimated dry air and water vapor partial pressures, the intake air temperature THA, an engine rotation speed Ne, and the absolute humidity xvap. In the block 606, a dry air amount ThQa and a water vapor amount ThH2O flowing into the intake pipe are added and, from this sum, a humid air amount QwMANI is calculated. Then, a humid air amount QwAR exiting the intake pipe is subtracted from the humid air amount QwMANI to calculate the humid air amount in the intake pipe and pressure conversion is applied to the calculated humid air amount to determine a pressure change. Since the calculation is carried out by a microcomputer, the actual calculation is subjected to Z-transform.

In this configuration example, since there is a delay in transferring the change of the humidity to the inside of the cylinder, the optimized fuel injection amount cannot be obtained if the measurement result is used without modification. To estimate the change of the water vapor flow rate in the cylinder, therefore, correct estimation of the water vapor flow rate in the intake pipe can be achieved.

Figure 7:
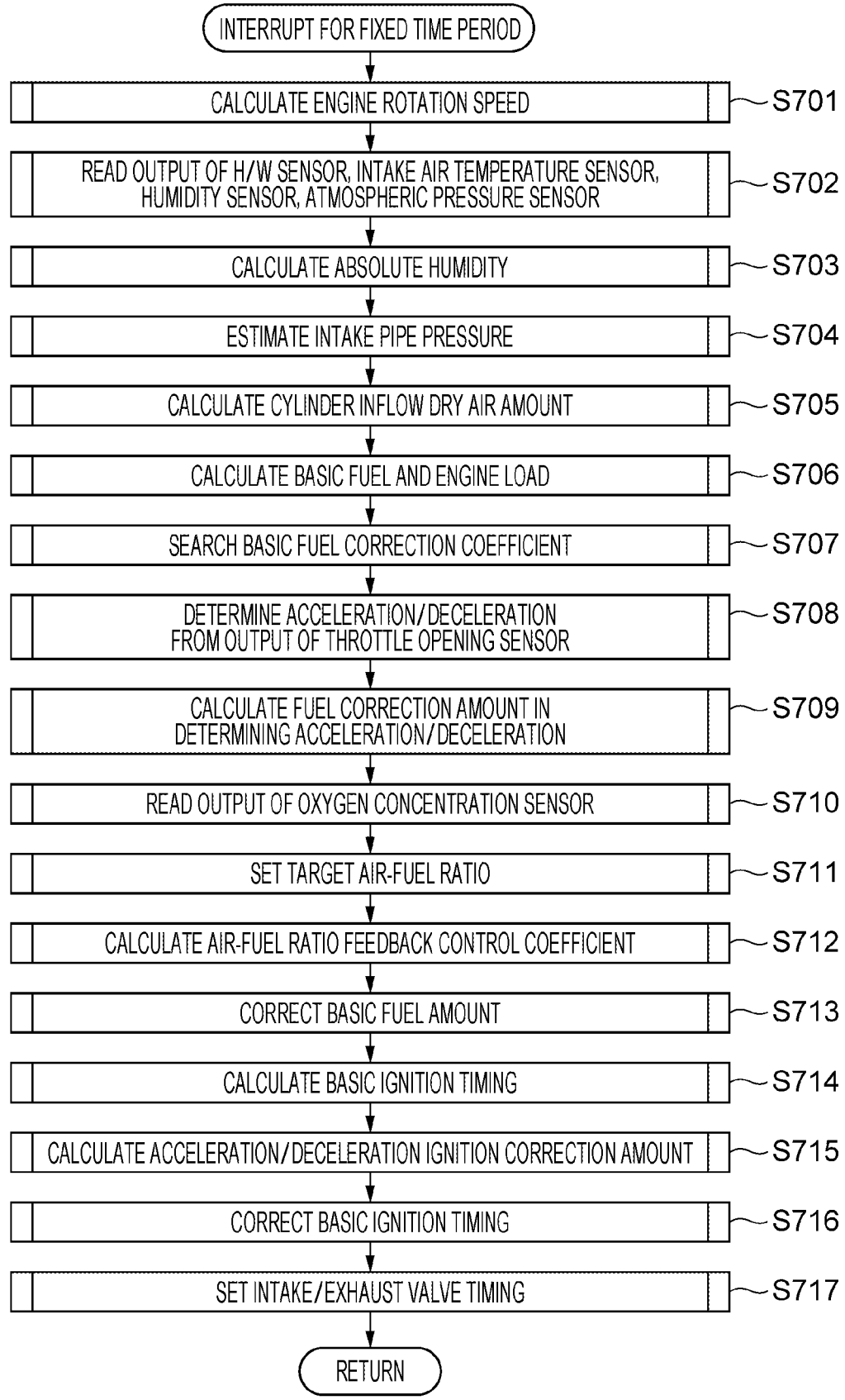
FIG. 7 is a flowchart explaining an example control flow of the internal combustion engine control apparatus according to the embodiment of the present invention.

FIG. 7 is a flowchart explaining an example of a control flow of the internal combustion engine control apparatus representing the subject matter of the present invention.

First, in step S701, the engine rotation speed is calculated. In step S702, the output of the mass flow sensor (e.g., the H/W sensor), the intake air temperature sensor, the humidity sensor, and the atmospheric pressure sensor are read. In step S703, the absolute humidity is calculated from the humidity detection value, the intake air temperature detection value, and the atmospheric pressure detection value. In step S704, the pressure in the intake pipe is estimated by carrying out balance calculation between the intake air amount, which is the detection value of the mass flow sensor, and the dry air amount and the water vapor amount calculated from the absolute humidity. In step S705, the cylinder inflow dry air amount flowing into the cylinder of the engine is calculated from the estimated values of the intake pipe pressure and the absolute humidity. In step S706, the basic fuel of the engine and the engine load are calculated from the engine rotation speed and the cylinder inflow dry air amount. For example, the basic fuel (amount) is calculated such that the basic fuel (amount) of the engine increases (or decreases) according to the increase (or decrease) of the cylinder inflow dry air amount. In step S707, the basic fuel correction coefficient of the engine is searched by map search from the engine rotation speed and the engine load. In step S708, acceleration/deceleration is determined from the output of the throttle valve opening sensor. In step S709, the fuel correction amount in determining acceleration/deceleration is calculated. In step S710, the output of the oxygen concentration sensor is read. In step S711, the target air-fuel ratio corresponding to each operation region of the engine is set. In step S712, the air-fuel ratio feedback control is carried out with the output of the oxygen concentration sensor and the target air-fuel ratio to calculate the air-fuel ratio feedback control coefficient. In step S713, the basic fuel (amount) is corrected according to the basic fuel correction coefficient, the fuel correction amount in determining acceleration/deceleration, and the air-fuel ratio feedback control coefficient. In step S714, the basic ignition timing is searched by map search according to the engine rotation speed and the engine load. In step S715, the acceleration/deceleration ignition correction amount of the basic ignition timing during acceleration is calculated. In step S716, the acceleration/deceleration ignition timing is corrected for the basic ignition timing with the acceleration/deceleration ignition correction amount. In step S717, the open/close timing of the intake valve and the exhaust valve corresponding to each operation region of the engine is set.

Figure 8:
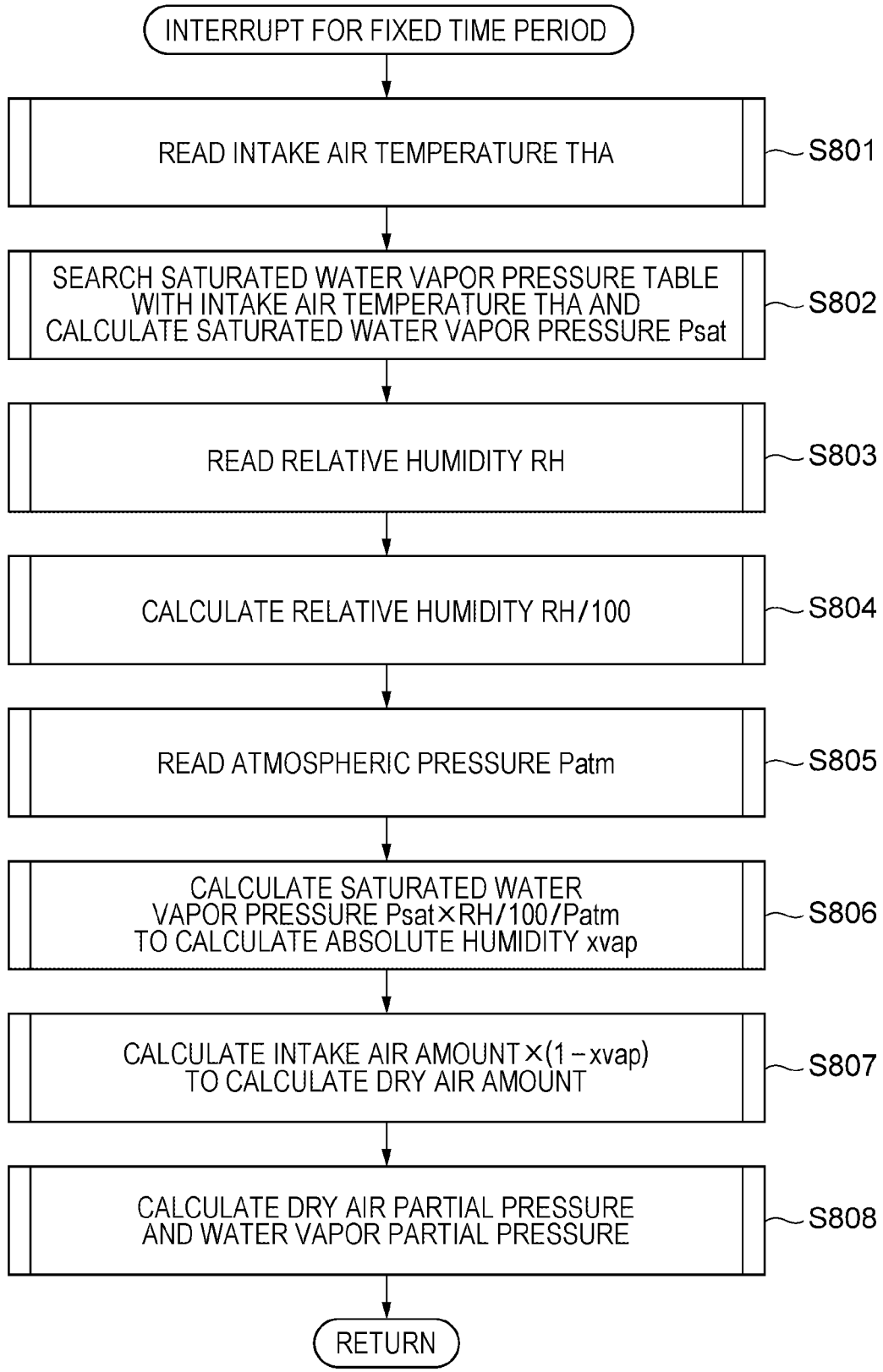
FIG. 8 is a flowchart explaining an example of a main part of the control flow of the internal combustion engine control apparatus according to the embodiment of the present invention.

FIG. 8 explains an example of a main part of the control flow for the internal combustion engine control apparatus representing the subject matter of the present invention. In particular, FIG. 8 is provided for detailed explanation of the absolute temperature and the calculation flow of the dry air partial pressure and the water vapor partial pressure in the intake pipe.

First, in step S801, the intake air temperature THA representing the output value of the intake air temperature sensor is read. In step S802, a table of saturated water vapor pressure is searched with the intake air temperature THA to calculate the saturated water vapor pressure Psat. In step S803, the relative humidity RH representing the output value of the humidity sensor is read. In step S804, the relative humidity RH/100 is calculated. In step S805, the atmospheric pressure Patm representing the output value of the atmospheric pressure sensor is read. In step S806, the saturated water vapor pressure Psat×RH/100/atmospheric pressure Patm is calculated to give the absolute humidity xvap. In step S807, the dry air amount is calculated by calculating the intake air amount×(1−xvap) representing the output value of the mass flow sensor. In step S808, the dry air partial pressure and the water vapor partial pressure in the intake pipe are calculated using the calculation result of step S807. In the present embodiment, the saturated water vapor pressure Psat is determined by searching a table corresponding to the intake air temperature THA, but may also be determined from an approximate expression of the intake air temperature THA.

Figure 9:
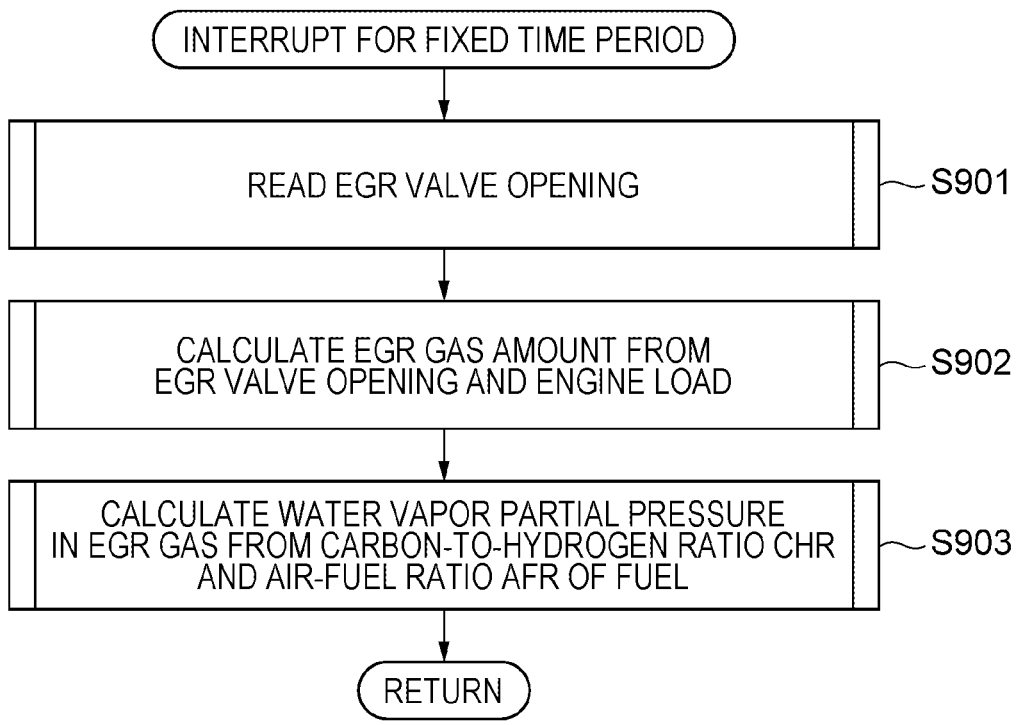
FIG. 9 is a flowchart explaining another example of the main part of the control flow of the internal combustion engine control apparatus according to the embodiment of the present invention.

FIG. 9 is provided for explaining another example of the main part of the control flow for the internal combustion engine control apparatus representing the subject matter of the present invention. In particular, FIG. 9 is provided for detailed explanation of the estimation flow of the water vapor amount in the EGR gas.

First, in step S901, the EGR valve opening representing the output value of the EGR valve opening sensor is read. In step S902, the EGR gas amount is calculated according to the EGR valve opening read in step S901 and the engine load. In step S903, the water vapor partial pressure in the EGR gas (exhaust gas) is calculated according to a carbon-to-hydrogen ratio CHR and an air-fuel ratio AFR of the fuel.

In this configuration example, the water vapor amount in the EGR gas (exhaust gas) is estimated by considering the composition of the fuel, especially the carbon-to-hydrogen ratio CHR of the fuel, whereby the intake air amount can be measured by considering the gas components in the flow-back exhaust gas.

FIG. 10 is a schematic view illustrating a part of an example of the internal combustion engine (engine) (with a supercharger) to which the internal combustion engine control apparatus according to the embodiment of the present invention is applied. In particular, FIG. 10 illustrates a partial structure around the intake system of the supercharged engine.

An illustrated intake system of an engine 2000 mainly includes a supercharger 2101 that supercharges the intake air amount with the pressure of the exhaust gas, an intake air throttle valve (throttle) 2102 that regulates the intake air amount of the engine 2000, a manifold 2103 disposed downstream of the throttle 2102, a fuel injection valve 2104 that supplies fuel to the cylinder, and an intake valve 2105. An intake air sensor 2100 that measures the air amount and the humidity of the intake air taken by the engine 2000 is provided upstream of the throttle 2102 (or further upstream of the supercharger 2101 disposed upstream of the throttle 2102 in the illustrated example).

In the following, estimating or calculating the dry air amount (the cylinder inflow dry air amount) and the water vapor amount (the cylinder inflow water vapor amount) taken by the cylinder of the engine 2000 in accordance with the detection signal detected by the intake air sensor 2100 are described specifically.

A relationship between the dry air amount Qa and the water vapor amount QH2O in the intake air amount QA00 measured by the intake air sensor 2100 is defined by Formula (1).

(Mathematical Formula 1)

$$QA00 = Qa + QH2O \quad (1)$$

Let RH be the relative humidity detected by the intake air sensor 2100. The water vapor amount QH2O is calculated from the intake air amount QA00 by Formulas (2)

(Mathematical Formula 2)

$$QH2O = QA00 \cdot Yvap \quad (2)$$
$$Yvap = (Xvap \cdot Wvap)/(Xvap \cdot Wvap + (1 - Xvap) \cdot Wair)$$
$$Xvap = Psat \cdot \frac{\frac{RH}{100}}{Patm}$$
$$Psat = \frac{101325}{1013} \times 6.11 \times 10^{\frac{7.5t}{t+237.3}}$$

Wair: Molar mass of dry air
Wvap: Molar mass of water
Patm: Atmospheric pressure
Psat: Saturated water vapor pressure
RH: Relative humidity
t: Temperature (intake air temperature)

Let MQa be the dry air amount and MH2O be the water vapor amount between the supercharger 2101 and the throttle 2102. Each amount is calculated from the balance between the dry air and the water vapor by Formulas (3)

(Mathematical Formula 3)

For dry air $\quad (3)$
$$\frac{d}{dt} \cdot MQa = Qa - ThQa$$
$$\frac{d}{dt} = \frac{1 - Z^{-1}}{\Delta t} \text{ then}$$
$$MQa = \Delta t \cdot (Qa - ThQa) + mqa$$

where
MQa: Dry air amount between supercharger and throttle
Δt: Calculation period
Qa: Dry air amount passing through supercharger
ThQa: Dry air amount passing through throttle
mqa: MQa from last calculation
Similarly, for water vapor
where
MH2O: Water vapor amount between supercharger and throttle
ThH2O: Water vapor amount passing through throttle
mh2o: MH2O of last calculation Let PMTRTH be a pressure between the supercharger and the throttle. The pressure PMTRTH is calculated by Formulas (4)

(Mathematical Formula 4)

$$\frac{d}{dt} \cdot PMTRTH = \frac{Rm \cdot THA}{KTRTHV} \cdot (QA00 - ThQA00) \quad (4)$$
$$PMTRTH = \frac{Rm \cdot THA}{KTRTHV} \cdot \Delta t \cdot (QA00 - ThQA00) + pmtrth$$

Rm: Air/gas coefficient
KTRTHV: Volume between supercharger and throttle
ΔT: Calculation period
THA: Intake air temperature
pmtrth: PMTRTH from last calculation
QA00: Intake air amount
ThQA00: Air amount passing through throttle Let PMMHG be a pressure between the throttle and the intake valve. The air amount passing through the throttle ThQA00 is calculated by Formula (5)

(Mathematical Formula 5)

$$ThQA00 = AA \cdot \frac{PMTRTH}{\sqrt{Rm \times (THA + 273)}} \sqrt{\frac{2k}{k-1}\left\{\left(\frac{PMMHG}{PMTRTH}\right)^{\frac{2}{k}} - \left(\frac{PMMHG}{PMTRTH}\right)^{\frac{k+1}{k}}\right\}} \quad (5)$$

Rm: Air/gas coefficient, THA: Intake air temperature
AA: Throttle opening area, k: Heat capacity ratio The pressure PMMHG between the throttle and the intake valve is calculated by Formulas (6)

(Mathematical Formula 6)

$$\frac{d}{dt} \cdot PMMHG = \frac{Rm \cdot THA}{KIMV} \cdot (ThQA00 - QAR) \quad (6)$$

$$PMMHG = \frac{Rm \cdot THA}{KIMV} \cdot \Delta t \cdot (ThQA00 - QAR) + pmmhg$$

Rm: Air/gas constant
KIMV: Intake pipe capacity (Capacity between throttle and intake air valve)
Δt: Calculation period
THA: Intake air temperature
pmmhg: PMMHG from last calculation
QAR: Air amount passing through intake valve The air amount passing through the intake valve QAR in Formula (6) is calculated by Formula (7)

(Mathematical Formula 7)

$$QAR = \frac{PMMHG \cdot KSV \cdot \frac{Ne}{2}}{Rm \cdot THA} \cdot \eta \quad (7)$$

Rm: Air/gas coefficient,
THA: Intake air temperature,
KSV: Engine displacement,
Ne: Engine rotation speed,
η: Intake coefficiency Thus, the dry air amount passing through the throttle, ThQa, and the water vapor amount passing through the throttle, ThH2O, are calculated by Formulas (8)

(Mathematical Formula 8)

$$ThQa = \frac{MQa}{MQa + MH2O} \cdot ThQA00 \quad (8)$$

$$ThH2O = \frac{MH2O}{MQa + MH2O} \cdot ThQA00$$

As in Formulas (3), the balance between the dry air and the water vapor in the manifold 2103 is determined by Formulas (9)

(Mathematical Formula 9)

$$IMQa = \Delta t \cdot (ThQa - CyQa) + imqa \quad (9)$$

IMQa: Dry air amount in manifold
ΔM: Calculation period
ThQa: Dry air amount passing through throttle
CyQa: Cylinder inflow dry air amount
imqa: IMQa from last calculation
IMH2O: Water vapor amount in manifold
ThH2O: Water vapor amount passing through throttle
CyH2O: Cylinder inflow water vapor amount
imh2o: IMH2O from last calculation The cylinder inflow dry air amount CyQa and the cylinder inflow water vapor amount CyH2O are determined by Formulas (10)

(Mathematical Formula 10)

$$CyQa = \frac{IMQa}{IMQa + IMH2O} \cdot QAR \quad (10)$$

$$CyH2O = \frac{IMH2O}{IMQa + IMH2O} \cdot QAR$$

Thus, the fuel injection amount of the fuel injection valve can be controlled properly and highly precisely using the cylinder inflow dry air amount CyQa and the cylinder inflow water vapor amount CyH2O determined as above.

In this configuration, since there is a delay in transferring the change of the water vapor amount to the inside of the cylinder, the optimized fuel injection amount cannot be obtained if the measurement result is used without modification. The change of the water vapor flow rate in the cylinder, therefore, can be estimated correctly by estimating the water vapor flow rate in the intake pipe.

The present invention is not limited to the above-described embodiment and may include various modifications. For example, the embodiment has been described in detail to facilitate the understanding of the present invention, and is not necessarily limited to the embodiment that includes the entire structure described above.

Further, all or part of the above-described configurations, functions, processing units, processing means, and the like may be formed using hardware by, for example, integrated circuit design. Further, the above-described configuration or functions may be implemented by software by a processor interpreting individual programs for implementing such configurations or function. The information of programs, table, or files that implement individual functions may be stored on a recording device, such as a memory, a hard disc, or a solid state drive (SSD), or a recording medium, such as an IC card, an SD card, or a DVD.

Control lines and information lines described above have been considered to be needed for description, but those lines may not represent all lines necessary for a manufactured product. In practice, it can be considered that most of the constituent components are connected mutually.

REFERENCE SIGNS LIST

100 internal combustion engine control apparatus
1000 internal combustion engine (engine)
1100 intake air throttle valve (throttle)
1101 unified humidity and mass flow sensor
1102 intake pipe
1103 unified pressure and intake-air-temperature sensor
1104 exhaust pipe
1105 channel (EGR channel)
1106 EGR valve
1107 EGR gas temperature sensor
1108 collector
1110 EGR valve opening sensor 1111 fuel injection valve
1112 ignition coil
1113 intake valve
1114 exhaust valve

The invention claimed is:

1. An internal combustion engine control apparatus configured to:
control a fuel injection amount of fuel injected into a cylinder through a fuel injection valve in accordance with a detected humidity detected by a humidity sensor that is disposed in an intake pipe to detect humidity of a portion of the intake pipe upstream of an intake air throttle valve,
calculate or correct a fuel injection amount through a fuel injection valve with a dry air flow rate calculated or estimated in accordance with (i) the detected humidity detected by the humidity sensor, and (ii) a detected air amount detected by a mass flow sensor configured to detect an air amount of the portion upstream of the intake air throttle valve.

2. The internal combustion engine control apparatus according to claim 1, wherein the internal combustion engine control apparatus is further configured to estimate the dry air flow rate of air flowing into the cylinder of the internal combustion engine located downstream of the humidity sensor in accordance with the detected humidity detected by the humidity sensor, and calculate or correct the fuel injection amount through the fuel injection valve in accordance with the estimated dry air flow rate.

3. The internal combustion engine control apparatus according to claim 1, wherein a flowback vent of an exhaust gas is located downstream of both the mass flow sensor and the humidity sensor.

4. The internal combustion engine control apparatus according to claim 3, wherein the internal combustion engine control apparatus is further configured to determine a water vapor flow rate and the dry air flow rate from an air flow rate obtained by the mass flow sensor and the detected humidity detected by the humidity sensor.

5. The internal combustion engine control apparatus according to claim 4, wherein the internal combustion engine control apparatus is further configured to estimate the dry air flow rate and the water vapor flow rate in the intake pipe in accordance with the water vapor flow rate and the dry air flow rate.

6. The internal combustion engine control apparatus according to claim 5, wherein the internal combustion engine control apparatus is further configured to estimate a dry air amount and a water vapor amount taken by the cylinder of the internal combustion engine in accordance with a dry air amount and a water vapor amount in the intake pipe.

7. The internal combustion engine control apparatus according to claim 6, wherein the internal combustion engine control apparatus is further configured to estimate the water vapor amount flowing into a portion downstream of the humidity sensor from a flowback amount of the exhaust gas.

8. The internal combustion engine control apparatus according to claim 7, wherein the internal combustion engine control apparatus is further configured to estimate the water vapor amount by considering a composition of fuel and the water vapor amount in the intake air with respect to the flowback amount of the exhaust gas.

9. The internal combustion engine control apparatus according to claim 6, wherein the internal combustion engine control apparatus is further configured to estimate the water vapor amount and a flow rate of a component other than the water vapor flowing into a portion downstream of the humidity sensor from a flowback amount of the exhaust gas.

10. The internal combustion engine control apparatus according to claim 9, wherein the internal combustion engine control apparatus is further configured to estimate the flow rate of the component other than the water vapor by considering a composition of the fuel and the water vapor amount in the intake air with respect to the flowback amount of the exhaust gas.

11. The internal combustion engine control apparatus according to claim 1, wherein the internal combustion engine control apparatus is further configured to calculate or correct the fuel injection amount from the fuel injection valve such that the fuel injection amount through the fuel injection valve increases or decreases with an increase or decrease of the dry air flow rate.

12. The internal combustion engine control apparatus according to claim 1, wherein the internal combustion engine control apparatus is further configured to calculate or correct the fuel injection amount through the fuel injection valve such that the fuel injection amount through the fuel injection valve decreases or increases with an increase or decrease of a flowback amount of the exhaust gas flowing back to the intake pipe.

13. The internal combustion engine control apparatus according to claim 1, wherein the internal combustion engine control apparatus is further configured to calculate or correct the fuel injection amount through the fuel injection valve such that the fuel injection amount through the fuel injection valve decreases or increases with an increase or decrease of a water vapor partial pressure of the exhaust gas flowing back to the intake pipe.

* * * * *